United States Patent [19]

Kobashi et al.

[11] Patent Number: 4,737,290
[45] Date of Patent: Apr. 12, 1988

[54] GEL FOR THE SEPARATION OF USEFUL COMPONENTS CONTAINED IN RHODANATE-CONTAINING DETOXICATION TREATED LIQUID AND METHOD OF SEPARATION USING SAID GEL

[75] Inventors: Toshiyuki Kobashi; Hideo Naka; Jinya Takeuchi, all of Okayama, Japan

[73] Assignee: Japan Exlan Company, Limited, Osaka, Japan

[21] Appl. No.: 22,548

[22] Filed: Mar. 9, 1987

Related U.S. Application Data

[62] Division of Ser. No. 798,683, Nov. 15, 1985, abandoned.

[30] Foreign Application Priority Data

Dec. 6, 1984 [JP] Japan ............................ 59-258730
Jul. 23, 1985 [JP] Japan ............................ 60-163744

[51] Int. Cl.$^4$ ............................................ B01D 15/08
[52] U.S. Cl. ................................. 210/635; 210/656;
210/681; 210/502.1; 210/904; 210/917;
423/236; 423/372
[58] Field of Search ............... 423/29, 236, 366, 372;
204/DIG. 13; 210/635, 656, 198.2, 681, 904, 917

[56] References Cited

U.S. PATENT DOCUMENTS 4,411,793 10/1983 Kato ................................. 210/656
4,565,832 1/1986 Kobashi et al. ................... 521/31

FOREIGN PATENT DOCUMENTS 58-29962 6/1983 Japan ............................... 210/635
2143243 2/1985 United Kingdom .

OTHER PUBLICATIONS

Macret, "Hydroxyalkyl Methacrylates: Hydrogel Formation Based on the Radical Copolymerization of 2-hydroxylethyl-methacrylate and 2,3-dihydroxpropyl-methacrylate, Polymer 1982, vol. 23, May, 748–753.

Primary Examiner—Ernest G. Therkorn
Attorney, Agent, or Firm—Wenderoth, Lind & Ponack

[57] ABSTRACT

The present invention provides a gel having excellent separation ability, operability and a long life, for separating useful components from a rhodanate-containing detoxication treated liquid. The gel consists of a crosslinked polymer with more than 50 weight % of repeating units which are composed of 2,3-dioxypropyl (meth)acrylate or 2,3-dioxypropyl (meth)allyl ether, and whose average particle diameter is more than 10$\mu$ and gel water content is from 30 to 150%. The present invention also provides a method of separation using said gel.

4 Claims, No Drawings

GEL FOR THE SEPARATION OF USEFUL COMPONENTS CONTAINED IN RHODANATE-CONTAINING DETOXICATION TREATED LIQUID AND METHOD OF SEPARATION USING SAID GEL

This application is a division, of now abandoned application Ser. No. 798,683, filed Nov. 15, 1985.

BACKGROUND OF THE INVENTION (a) Field of the Invention

The present invention relates to a gel for the separation of useful components from a rhodanate-containing detoxication treated liquid and to a method of separation using said gel.

(b) Description of the Prior Art

Hydrogen cyanide and hydrogen sulfide which are regarded as a cause of air pollution and water contamination are most often contained in fuel gases such as coke oven gas and cracked crude oil gas or in various unpurified raw gases. Therefore, in order to remove such toxic substances from these gases, various desulfurization and decyanization methods were proposed. Among others, the detoxication treatment described in "Kagaku Kogyo" (Chemical Industry) vol. 23, no. 7, p 922–927 (1972) is regarded as the most practical. This method is a combination of the Fumacks desulfurization method and Rhodacks decyanization method. The former is a wet type desulfurization method of sulfur recovery system in which hydrogen sulfide in the gas is separated and removed as sulfur by using as a catalyst, an aromatic polynitro compound such as picric acid, nitrophenol, trinitrobenezoic acid, nitro compounds of resorcin, etc. or a quinone type catalyst such as sodium naphthoquinone sulfonate, sodium anthraquinone sulfonate, etc. The latter is a decyanization method in which HCN, which is very toxic, is fixed and removed as a non-toxic rhodanate by washing the hydrogen cyanide-containing gas with an alkaline sulfur suspension. By this combination, the hydrogen cyanide and hydrogen sulfide in the gas are removed at high efficiency. In this detoxication method, the treatment liquid taken out of the reaction system contains, besides the rhodanate, an oxyacid salt of inorganic sulfur as a by-product. Furthermore, the above-mentioned aromatic polynitro compound as a catalyst and its reduction product are also contained in the treatment liquid, and therefore the liquid assumes a deep red color. Accordingly, it is not desirable to discharge it into rivers. Rather, the rhodanate and oxyacid salt of sulfur contained in the treated liquid are useful as industrial chemicals. Therefore, it is desirable to separate the useful components in the liquid and to utilize them for their respective uses. As a method of separating the useful components, i.e. the rhodanate and oxyacid salt of sulfur, the Applicant proposed a method which was described in Japanese Patent Publication No. 4000/78.

The cross-linked dextran gel used in this method is obtained by cross-linking dextran dissolved in water with epichlorohydrin in a reversed phase suspension system. As apparent from its production method and physical properties, the gel is a "soft gel" and has an inferior mechanical strength. Therefore, the gel, when used in a large scale industrial apparatus, can not display its ability sufficiently because of its destruction and compression. This necessarily creates a difficulty in elevating the treating ability, since, for example, there is a limit in increasing the rate of liquid passage. Furthermore, for elevating the separation ability, it is generally effective to use a gel of small particle diameters, but the use of such a gel results in increasing the operation pressure. This obliges us to use a gel of large diameters which gives a small pressure loss. After all, the use of the cross-linked dextran gel gives unsatisfactory separation results, and furthermore the concentrations of the useful components in the eluate must become low, which entails an economical disadvantage. In addition, in the operation on an industrial scale, since it is difficult to completely prevent suspended particles from coming into the treatment liquid, the suspended particles clog the packed gel layer, and this inevitably increases the operation pressure. When using the cross-linked dextran gel, which is mechanically weak, the back wash operation (operation to remove the blockage due to the suspended particles by back washing the packed gel layer) must be conducted frequently, and this substantially shortens the working time.

In the aqueous solution containing the remaining components after the recovery of the rhodanate, there are contained various catalyst components useful in the desulfurization and decyanization processes, and alkaline substances. The discard or loss of such useful components is not desirable for the operation of the desulfurization and decyanization processes from the industrial viewpoint.

SUMMARY OF THE INVENTION

An object of the present invention is to eliminate such existing defects and to provide a gel which exhibits exellent separation ability to separate useful components from a rhodanate-containing detoxication treated liquid and which is remarkably improved in resistance to pressure, life, treating ability and working time.

Another object of the present invention is to provide an economical process which enables the recovery and reuse of the catalysts and alkalis by returning the remaining liquid of the detoxication treatment (from which the rhodanate has been separated) to the absorbing liquid of the desulfurization and decyanization processes.

The objects of the present invention are attained by a gel of a cross-linked polymer whose more than 50 weight % of the repeating units are composed of 2,3-dioxypropyl(meth)acrylate or 2,3-dioxypropyl(meth)allylether and whose average particle diameter is more than $10\mu$ and water content is from 30 to 150%, and by separating the rhodanate and other components from an aqueous solution containing the rhodanate as the main component and obtained by detoxicating the gas containing hydrogen cyanide and hydrogen sulfide, by gel filtration using the substantially nonionic hydrophilic gel, then recovering the rhodanate and reusing the other components as the absorbing liquid in the desulfurization and decyanization processes which are the detoxication treatment processes.

DETAILED DESCRIPTION OF THE INVENTION

In the following, the present invention will be explained in more detail.

The gel according to the present invention is a cross-linked polymer whose more than 50 weight %, desirably more than 60 weight %, and more desirably more than 70 weight %, of the repeating units are composed of 2,3-dioxypropyl(meth)acrylate or 2,3-dioxypropyl(meth)allyl ether. Moreover, it is necessary that the average particle diameter of this polymer should be more than 10μ, preferably in the range of from 30 to 150μ, and the gel water content should be from 30 to 150%, preferably in the range of from 50 to 100%. As far as a gel having such characteristics can be obtained, any method may be employed for its production without limitation. A hard gel (mechanically strong gel) can be obtained by increasing the use ratio of the cross-linking monomer. But the use of an increased ratio of the cross-linking monomer lowers the gel water content which is an especially important characteristic for the attainment of the present invention. Therefore, by using the cross-linking monomer in combination with a diluent which is a slightly water-soluble or water-insoluble organic solvent, the desired gel can be produced industrially advantageously.

As the cross-linking monomer, 3 to 30 weight % of an addition polymerizable monomer having 2 or more of carbon-carbon unsaturated double bonds, such as divinyl benzene, ethylene glycol dimethacrylate, diethylene glycol dimethacrylate, polyethylene glycol dimethacrylate, N,N'-methylenebisacrylamide, etc. can be preferably used. Of course, if desired, other monomers such as vinyl halides and vinylidene halides, (meth)acrylic acid and salts thereof, (meth)acrylic acid esters, vinyl esters, acrylamide, styrene, ethylenically unsaturated sulfonic acids and salts thereof can be used. The methods of gel production are described in detail in Japanese Patent Application No. 108422/83 and No. 22633/84, filed by the present Applicant.

In the following is explained the technique of separating the useful components from the rhodanate-containing detoxication treated liquid by using the gel of the present invention.

After the detoxication treated liquid is supplied to the gel and the useful components are caught by the gel, an eluent is made to pass through the gel layer. Then the eluate flows out in the order of oxyacid salts of inorganic sulfur, part of colored components of the treated liquid, rhodanate, and the remaining colored components. Therefore, the eluate containing oxyacid salts of inorganic sulfur is first separated and collected, then the part of colored components are made to flow away together with the eluate, the rhodanate-containing eluate which follows is separated and collected, and finally the remaining colored components are made to flow away. By this method, it is possible to separate the useful components industrially advantageously at an excellent separation power.

It is desirable that the supply quantity of the detoxication treated liquid should be less than 30%, preferably from 5 to 20% of the volume of the gel packed in the column. The supply rate of the eluent (water, dimethylformamide, methanol, etc.) to the column is at a superficial linear velocity based on empty column of 0.5 cm/min to 5 cm/min, preferably from 1 cm/min to 3 cm/min.

The rhodanates existing in the detoxication treated liquid include alkali metal salts, alkaline earth metal salts and ammonium salt. The kind of rhodanate is different depending on the kind of chemicals used in the detoxication treatment, but most often, the treated liquid contains ammonium rhodanate. Similarly, in the case of oxyacid salts of inorganic sulfur, various sulfates, sulfites, etc. can be cited, but most often, the treated liquid contains ammonium sulfate, ammonium thiosulfate, etc.

Among the components thus separated, the rhodanate is concentrated, and supplied for various industrial uses as a concentrated solution or in the form of crystals.

On the other hand, the remaining components are reused as the absorbing liquid in the desulfurization and decyanization processes in which the gas containing hydrogen sulfide and hydrogen cyanide is subjected to detoxication treatment.

Since the detoxication treated liquid supplied to gel filtration separation is diluted by water, which is the eluent, the liquid to be returned to the desulfurization and decyanization processes as the absorbing liquid for reuse increases in a quantity of 2 to 7 times the detoxication treated liquid supplied, depending on the gel filtration condition. Accordingly, there are cases wherein the quantity of the absorbing liquid loses its balance, resulting in an excess quantity of the liquid. In such a case, the balance of the absorbing liquid can be maintained by concentrating the liquid by evaporation or membrane separation, prior to returning it to the desulfurization and decyanization processes.

It is also possible to maintain the balance of the quantity of the absorbing liquid by supplying the detoxication treated liquid to gel filtration separation after concentrating it, thereby elevating the concentration of the eluent and reducing the liquid quantity.

We do not fully understand why the gel of the present invention exhibits such excellent ability in the separation of useful components from the rhodanate-containing detoxication treated liquid. However, we suppose that, by the combined effects of various characteristics of the gel including the quantity of the main repeating units composing the cross-linked polymer and that of the cross-linking monomer, the gel water content resulting therefrom, the particle diameter of the polymer and the voids existing inside the polymer particles, and by the absorptive action between the eluent molecules and the gel, and a molecular sieve effect, the useful components can be clearly separated and eluted.

It is a striking effect of the present invention that the invention has provided a process which makes it possible to separate and collect, industrially advantageously, the rhodanate existing in the liquid of detoxication treatment of hydrogen cyanide and hydrogen sulfide contained in the fuel gases such as coke oven gas and cracked crude oil gas, and which enables the recovery of the catalysts and alkalis in the liquid of detoxication treatment that can be reused in the desulfurization and decyanization processes, thereby remarkably cutting down the operation cost of the installation of detoxication treatment.

It is also a characteristic advantage of the present invention that the invention has provided a gel which makes it possible to recover the useful components at high concentration because of its excellent separation ability (sharp peak of the elution curve) and which has operational and economical advantages resulting from the prolonged life and working time of the gel due to its excellent mechanical strength, and the improved treating ability due to its high resistance to pressure.

Furthermore, the advent of the gel for separation and and the method of separation according to the present invention has made it possible to advantageously collect rhodanates which can be widely used for the production of the solvent to produce acrylic fibers, for the production of synthetic resins, and for dyeing industry, and as an antiseptic, antioxidant, photographic sensitizer, etc.

In the following the present invention will be explained in more detail by examples, however it is to be understood that the invention is not limited as to its scope by the description of the examples, in which parts and percentages are by weight unless otherwise indicated.

The gel water content in the examples was obtained as follows: Polymer particles which has been sufficiently brought into equilibrium with deionized water are put into a centrifuge having a centrifugal effect of 2000 G for 5 minutes to remove the water on the surface of the particles. Thereafter, the weight ($W_1$) of the polymer particles is measured and then the weight after drying is measured ($W_2$). The gel water content is calculated by the following formula:

$$\text{Gel water content} = \frac{W_1 - W_2}{W_2} \times 100 \, (\%)$$

EXAMPLE 1

Twenty parts of a water-soluble copolymer of methacrylic acid/sodium p-styrene sulfonate (70/30) and two parts of polyvinyl alcohol (the degree of polymerization: 1000; the degree of saponification: 87%) were dissolved in 656 parts of water, and the solution was charged into a polymerization vessel equipped with a paddle shaped stirrer.

Thereafter, two parts of 2,2-azobis-(2,4-dimethyl valeronitrile) was dissolved in a mixture of 178 parts of glycidyl methacrylate, 22 parts of ethylene glycol dimethacrylate and 120 parts of epichlorohydrin, and the solution was charged into the polymerization vessel. The whole solution was then polymerized at 60° C. for 3 hours.

Then, five parts of formic acid was added to the polymerization solution and the solution was heat-treated at 90° C. for three hours. A water-swollen bead-like polymer having a gel water content of 63% was obtained.

The polymer particles were sieved out and the particles of intermediate size between 200 and 350 mesh size were taken out. The particles were packed into a column of 5 cm in inner diameter and 50 cm in height. One hundred ml of a waste liquid from coke oven gas treatment containing about 15% ammonium rhodanate, about 8% ammonium thiosulfate, about 0.5% ammonium sulfate and a small quantity of a picric acid catalyst, was supplied to the column. Deionized water, as the eluent, was made to pass through the column at the rate of 30 ml/min, thereby separating the eluate into a mixed aqueous solution of ammonium thiosulfate and ammonium sulfate and an aqueous solution of ammonium rhodanate.

After the above separating operation was repeated 40 times, the operational pressure was elevated. Therefore, deionized water was made to pass through the column from the reverse side for three hours for back wash. Thereafter, the separating operation was repeated again. Both the pressure and separating power were then restored to the normal condition.

For purposes of comparison, the same separating operation was conducted except that Sephadex G-10 (a cross-linked dextran gel produced by Pharmacia Fine Chemicals) was used. When the separating operation was repeated 22 times, the pressure was elevated to such a state that almost no eluate flowed out, and thus the operation became impossible.

In Table 1 are shown the concentration and the recovery ratio of the ammonium rhodanate solution, obtained in each test.

TABLE 1

| Kind of gel | Ammonium rhodanate | |
|---|---|---|
| | Concentration (%) | Recovery ratio |
| Gel of the invention | 6.8 | More than 97% |
| Sephadex G-10 for comparison | 4.2 | 94% |

From the above results, it is understood that the gel of the present invention has excellent separating ability and industrial advantages such as high resistance to pressure, long working life, etc.

EXAMPLE 2

A bead-like polymer produced and sieved out in the same way as described in Example 1 was packed into a column of an inner diameter of 80 cm and a height of 100 cm. From the top of the column was supplied 51.2 liters of a waste liquid from the treatment of coke oven gas containing about 15% ammonium rhodanate, about 2% ammonium thiosulfate, about 0.5 ammonium sulfate, slight quantities of a picric acid catalyst, ammonium carbonate, ammonium hydrosulfide, and ammonium sulfide. Thereafter, deionized water as the eluent, was made to pass at the rate of 10.2 liters/min.

The eluate (I) between 15 minutes and 27 minutes after the beginning of the passage of the eluent, and the eluate (II) between 27 minutes and 40 minutes after were recovered separately.

The ammonium rhodanate concentration of the recovered liquid (II) was 5.7%. After concentrating and crystallizing it, ammonium rhodanate in solid form with a purity of 98.5% was obtained. This rhodanate purity presents practically of no problem in use for example, as a solvent for the production of acrylic synthetic fibers.

The recovered liquid (I) was returned to the desulfurization process as a supplement to the absorbing liquid.

By repeating this operation to treat the waste liquid extracted from the desulfurization and decyanization processes, it was possible to recover ammonium rhodanate of high purity and save about 45% of the amount of the picric acid catalyst used in the desulfurization process. Also the conventional waste liquid disposal became unnecessary.

What we claim is:

1. A method of separating useful components from a rhodanate-containing detoxication treated liquid including colored components, which comprises in sequence:
   (a) passing an aqueous solution containing a rhodanate as the main component and obtained by desulfurization and decyanization treatment of a gas containing hydrogen sulfide and hydrogen cyanide, through a layer of a gel consisting of a cross-linked polymer having more than 50% by weight of repeating units which are 2,3-dihydroxypropyl (meth)acrylate or 2,3-dihydroxypropyl (meth)allylether and having an average particle diameter of more than $10\mu$ and gel water content of 30 to 150%, thereby retaining the useful components in said aqueous solution on said gel;
   (b) passing a first portion of an eluent through the gel so as to produce an eluate containing oxyacid salts of inorganic sulfur and separating and collecting said eluate containing oxyacid salts of inorganic sulfur;

(c) passing a second portion of an eluant through the gel layer to remove a part of the colored components;

(d) passing at third portion of an eluent through the gel layer so as to produce an eluant containing rhodanate and separating and collecting said eluate containing rhodanate and (e) passing a fourth portion of an eluent through the gel layer to remove the remaining colored components.

2. The method as claimed in 1 wherein the amount of the aqueous solution to be passed through the gel layer is less than 30% of the volume of the gel.

3. The method as claimed in claim 1 wherein the gel layer is in the form of a column and the eluent is passed through the column at a superficial linear velocity based on empty column of from 0.5 to 5 cm/min.

4. The method as claimed in claim 1 wherein the aqueous solution from which rhodanate has been separated is recycled to the desulfurization and decyanization treatment.

* * * * *